United States Patent
Elkanovich et al.

(10) Patent No.: US 11,144,485 B1
(45) Date of Patent: Oct. 12, 2021

(54) INTERFACE FOR SEMICONDUCTOR DEVICE WITH SYMMETRIC BOND PATTERN AND METHOD FOR ARRANGING INTERFACE THEREOF

(71) Applicants: Global Unichip Corporation, Hsinchu (TW); Taiwan Semiconductor Manufacturing Company, Ltd., Hsinchu (TW)

(72) Inventors: Igor Elkanovich, Hsinchu (TW); Amnon Parnass, Hsinchu (TW); Pei Yu, Hsinchu (TW); Li-Ken Yeh, Hsinchu (TW); Yung-Sheng Fang, Hsinchu (TW); Sheng-Wei Lin, Hsinchu (TW); Tze-Chiang Huang, Hsinchu (TW); King Ho Tam, Hsinchu (TW); Ching-Fang Chen, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 17/037,743

(22) Filed: Sep. 30, 2020

Related U.S. Application Data

(63) Continuation-in-part of application No. 16/999,055, filed on Aug. 20, 2020.

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS

| | | |
|---|---|---|
| 6,049,894 A | 4/2000 | Gates |
| 9,389,953 B2 | 7/2016 | Choi et al. |
| 9,530,442 B1 | 12/2016 | Hassner et al. |
| 10,592,448 B2 | 3/2020 | Chang |
| 10,929,331 B1 * | 2/2021 | Camarota ............... G06F 13/42 |
| 2008/0147964 A1 | 6/2008 | Chow et al. |

(Continued)

OTHER PUBLICATIONS

"Notice of Allowance of U.S. Appl. No. 17/037,739", dated Apr. 5, 2021, pp. 1-11.

*Primary Examiner* — Elias Mamo
(74) *Attorney, Agent, or Firm* — JCIPRNET

(57) ABSTRACT

An interface for a semiconductor device includes a master device and a plurality of slave devices. The interface includes a master interface and a slave interface. The master interface is implemented in the master device and includes a master bond pattern of master bonds arranged as a first array. The slave interface is implemented each slave device and includes a slave bond pattern of slave bonds arranged as a second array. The first array of the master bonds includes a first central row and first data rows in two parts being symmetric to the first central row. The second array of the slave bonds includes a second central row and second data rows in two parts being symmetric to the second central row. The first central row and the second central row are aligned in connection, and the first data rows are connected to the second data rows.

26 Claims, 17 Drawing Sheets

(56) References Cited

U.S. PATENT DOCUMENTS

| | | | | |
|---|---|---|---|---|
| 2012/0319730 A1* | 12/2012 | Fitton | ................... | G06F 13/385 |
| | | | | 326/41 |
| 2013/0173832 A1* | 7/2013 | Calvin | .................. | G06F 13/364 |
| | | | | 710/110 |
| 2017/0077916 A1* | 3/2017 | Zhou | .................. | H03K 19/0175 |
| 2019/0213164 A1* | 7/2019 | Kwon | ....................... | G06F 1/08 |
| 2019/0347159 A1 | 11/2019 | Chang et al. | | |
| 2019/0385498 A1* | 12/2019 | Murakami | ............. | G09G 3/006 |

\* cited by examiner

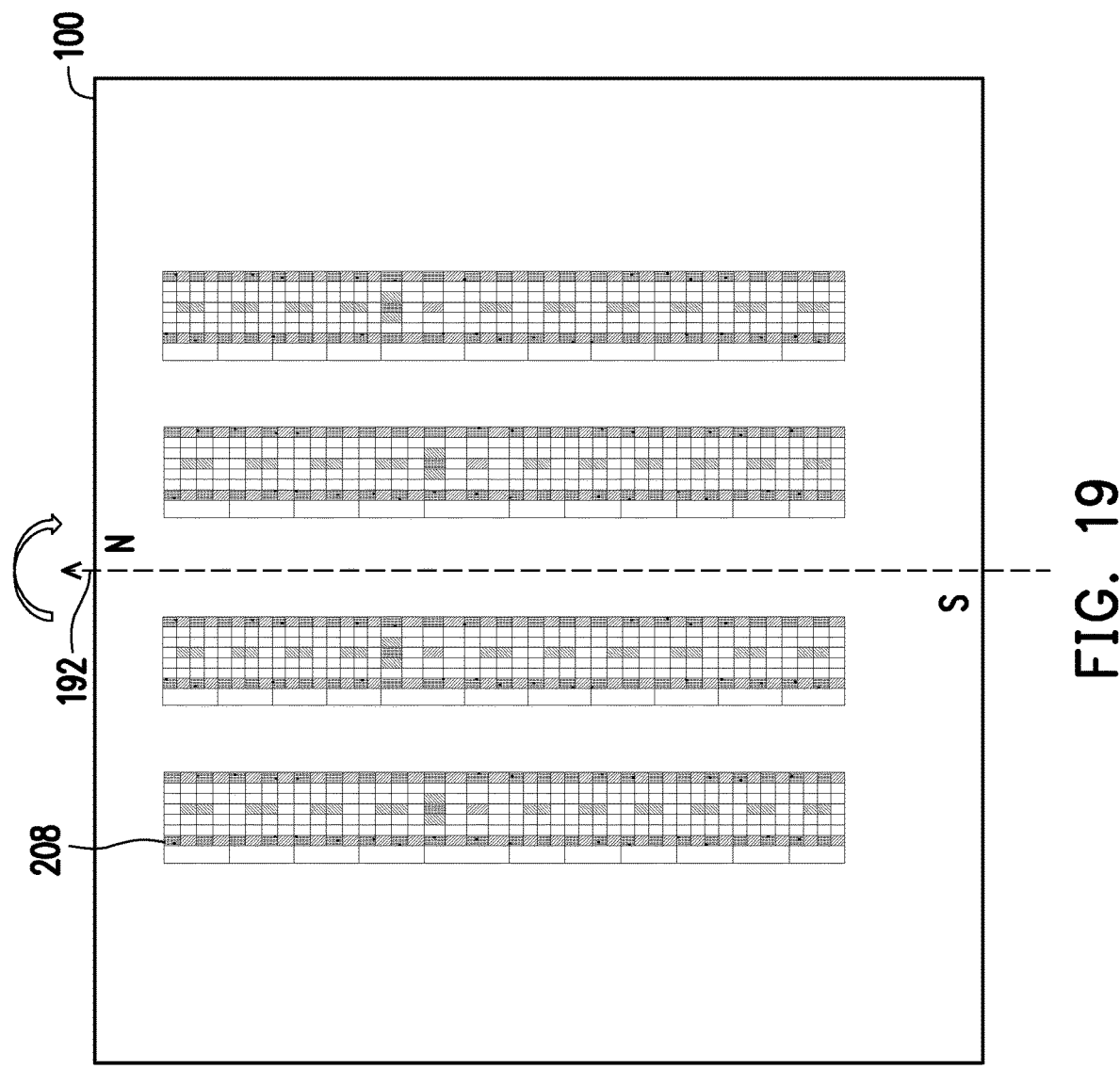

INTERFACE FOR SEMICONDUCTOR DEVICE WITH SYMMETRIC BOND PATTERN AND METHOD FOR ARRANGING INTERFACE THEREOF

CROSS-REFERENCE TO RELATED APPLICATION

This application is a continuation-in-part application of and claims priority benefit of U.S. application Ser. No. 16/999,055, filed on Aug. 20, 2020, now pending. The entirety of the above-mentioned patent application is hereby incorporated by reference herein and made a part of this specification.

BACKGROUND

Technical Field

The invention is related to fabrication of semiconductor device and more particularly to an interface for a semiconductor device and the interfacing method for the semiconductor device.

Description of Related Art

The digital electronic apparatus based on semiconductor integrated circuit such as mobile phones, digital cameras, personal digital assistants (PDAs), and so on are designed to have to be more powerful functionalities to adapt various applications in the modern digital world. However, the digital electronic apparatus as the trend in semiconductor fabrication intends to be smaller and lighter, with improved functionality and higher performance. The semiconductor device may be packaged into a 3D semiconductor device, in which several circuit chips may be stacked up and integrated as a larger integrated circuit, in which the bonds and the through-silicon via (TSV) are used to connect between the chips.

The packaging technology in system-on-integrated-chips (SoIC) package and wafer-on-wafer (WoW) package, and chip-on-wafer-on-substrate (CoWoS) have been proposed to package multiple chips as stacked up in height.

However, the communication between the master chip and multiple slave chips as the 3D stack is still under development to have better performance with a compact structure. Further, the bond patterns between two chips need to be arranged to be easily connected to adapt the 3D stack of multiple chips.

SUMMARY

The invention provides the interface for a 3D semiconductor device, in which single master chip is stacked with multiple slave chips thereon to form a 3D package structure. The interface allows the communication between the single master chip and the slave chips in an efficient way. The bond patterns are respectively included in the interface for the master chip and each slave chip. The interface between the master chip and all the slave chips as stacked up may transmit or receive signals through the bond patterns.

In an embodiment, the invention provides an interface for a semiconductor device, the semiconductor device including a master device and a plurality of slave devices. The interface includes a master interface and a slave interface for each slave devices. The master interface is implemented in the master device and includes a master bond pattern of master bonds arranged as a first array. The slave interface is implemented in each of the slave devices and includes a slave bond pattern of slave bonds arranged as a second array. The first array of the master bonds includes a first central row and first data rows in two parts being symmetric to the first central row. The second array of the slave bonds includes a second central row and second data rows in two parts being symmetric to the second central row. The first central row and the second central row are aligned in connection, and the first data rows are connected to the second data rows.

In an embodiment, the invention also provides a method for arranging an interface for a semiconductor device, the semiconductor device including a master device and a plurality of slave devices, the method comprising providing a master interface, implemented in the master device and including a master bond pattern of master bonds arranged as a first array; and providing a slave interface, implemented in each of the slave devices and including a slave bond pattern of slave bonds arranged as a second array. The first array of the master bonds as arranged includes a first central row and first data rows in two parts being symmetric to the first central row. The second array of the slave bonds as arranged includes a second central row and second data rows in two parts being symmetric to the second central row. The first central row and the second central row are aligned in connection, and the first data rows are connected to the second data rows.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 19 is a drawing, schematically a flip application of the whole chip with respect to the Y-axis, according to an embodiment of the invention.

DESCRIPTION OF THE EMBODIMENTS

The invention is directed to an interface for a 3D semiconductor device, in which the interface is also fabricated based on the 3D packaging technology. The interface may link single master chip such as processor with multiple slave chips such as static random access memory (SRAM).

In the invention the interface allows the communication between the master chip and the multiple slave chips. The communication signals may include the command from the master chip and the responding information from the one of the slave chips as selected. The interface provides a reliable communication. In addition, the signal latency between the master chip and each of the slave chips may be stable as about a constant and predictable. The due to the control of the latency, the trigger edge of the effective clock may be properly set corresponding to the data packet, which may also be referred as a data eye.

Several embodiments are provided for describing the invention but the invention is not just limited to the embodiments.

Figure 1:
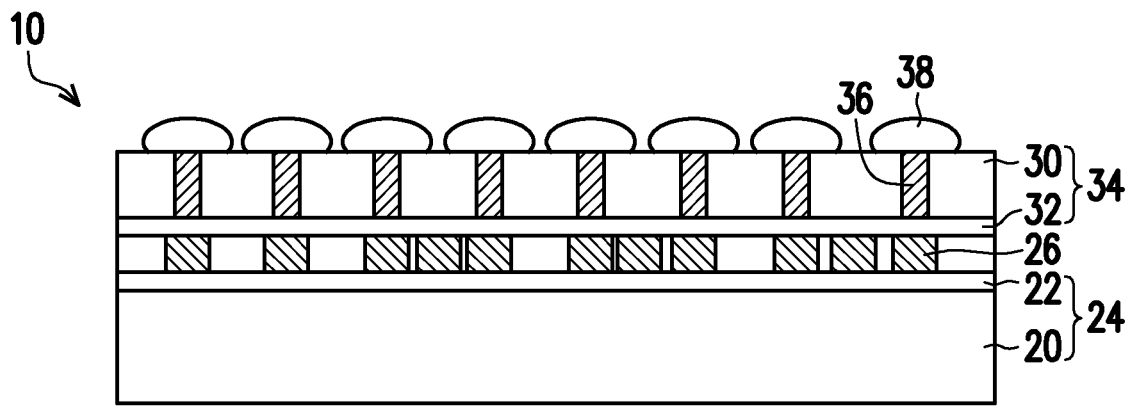
FIG. 1 is a drawing, schematically illustrating a cross-sectional stack structure of 3D semiconductor device, according to an embodiment of the invention.

FIG. 1 is a drawing, schematically illustrating a structure of 3D semiconductor device in cross-sectional view, according to an embodiment of the invention. Referring to FIG. 1, a 3D semiconductor device 10 includes multiple chips 24, 34, which are vertically stacked up in addition to the horizontal distribution of the chips. As a result, the 3D semiconductor device includes the chips is formed.

In an example, a circuit chip 24 may be treated as a master chip, which generally includes the substrate 20 and the circuit layer 22. Several other circuit chips 34, such as serving as the slave chips, are to be stacked over the circuit chip 24, in which the through via structures, such as TSV structure 26 with bonds, based on the packaging process may be formed between the circuit chip 24 and the circuit chips 34. The circuit chip 34 includes the substrate 30 and the circuit layer 32 and may further include the TSV structures 36 at the corresponding locations to electrically connect to the circuit chip 24. In addition, the bonds 38 may also be formed at the most outer surface corresponding to the TSV structures 36.

The 3D packaging technology has been proposed in various stack structure, such as system-on-integrated-chips (SoIC) package, wafer-on-wafer (WoW) package, and chip-on-wafer-on-substrate (CoWoS). The invention is based on the 3D packaging but not limited to the types of the 3D packaging.

Figure 2:
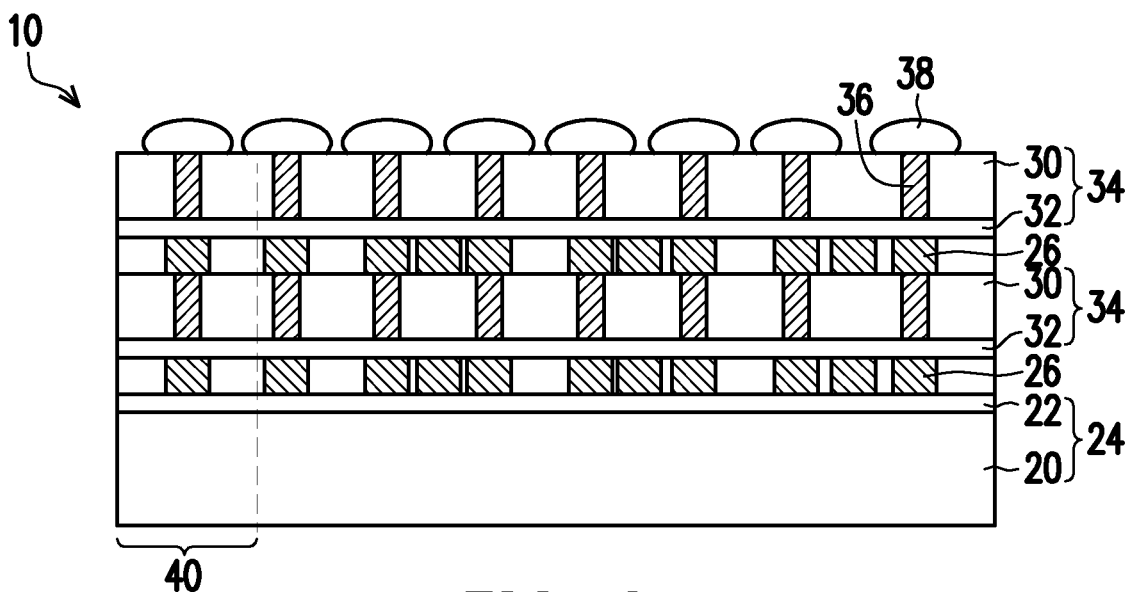
FIG. 2 is a drawing, schematically illustrating a cross-sectional stack structure of 3D semiconductor device with an interface, according to an embodiment of the invention.

FIG. 2 is a drawing, schematically illustrating a cross-sectional stack structure of 3D semiconductor device with an interface, according to an embodiment of the invention. Referring to FIG. 2, Based on the 3D package structure, in an embodiment, the 3D semiconductor device 10 may also include an interface region 40, where an interface in each circuit chip 24, 34 is formed at the interface region 40. The interface may link the circuit chip 24, serving as the master chip, to all of the circuit chips 34, which are serving as the slave chips. The communication between the circuit chip 24 and the circuit chips 34 may go through the interface at the interface region 40.

The circuit of the interface implemented within the interface region 40 would be described in detail later. As also noted, in an embodiment, multiple interface regions 40 as actually needed may be formed in the circuit chips, not limiting to single interface region.

Figure 3:
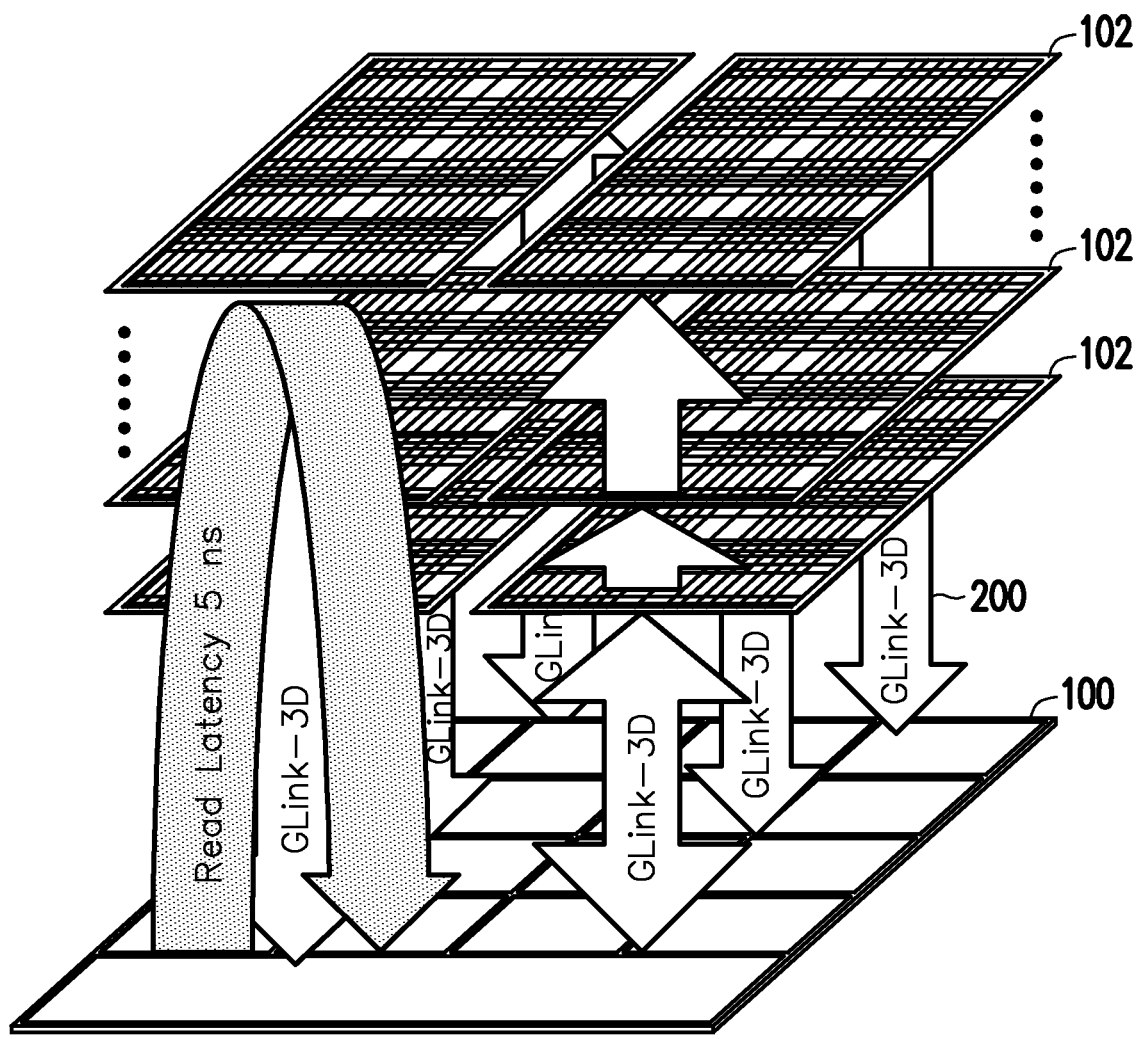
FIG. 3 is a drawing, schematically illustrating a perspective stack structure of 3D semiconductor device with the communication mechanism of the interface, according to an embodiment of the invention.

FIG. 3 is a drawing, schematically illustrating a perspective stack structure of 3D semiconductor device with the communication mechanism of the interface, according to an embodiment of the invention.

Referring to FIG. 3, as viewed in 3D stack structure in operation of the interface, a master chip 100, such as a processor chip, is included as a base chip in the semiconductor device. Multiple slave chips 102, such as SRAM chips, are stacked over the master chip 100. The master chip 100 includes a master interface and each slave chip includes a slave interface. The master interface and the slave interfaces form as an interface 200, which may also be referred as Glink-3D. The master chip 100 and the slave chips 102 are linked by the interface 200 to communication with the information/data/signal.

In an operation as an example, the master chip 100 of processor has a command to access the data stored the slave chips 102 of SRAM chips. Due to the interface as implemented, the read latency may be controlled to be about constant and small, such 2 ns or 5 ns in the examples. A single clock is used in the interface to distribute to all the slave chips, the path length from the master chip 100 to each slave ship 102 is about the same and reliable. The latency can be adjusted to be about constant as predictable.

Figure 4:
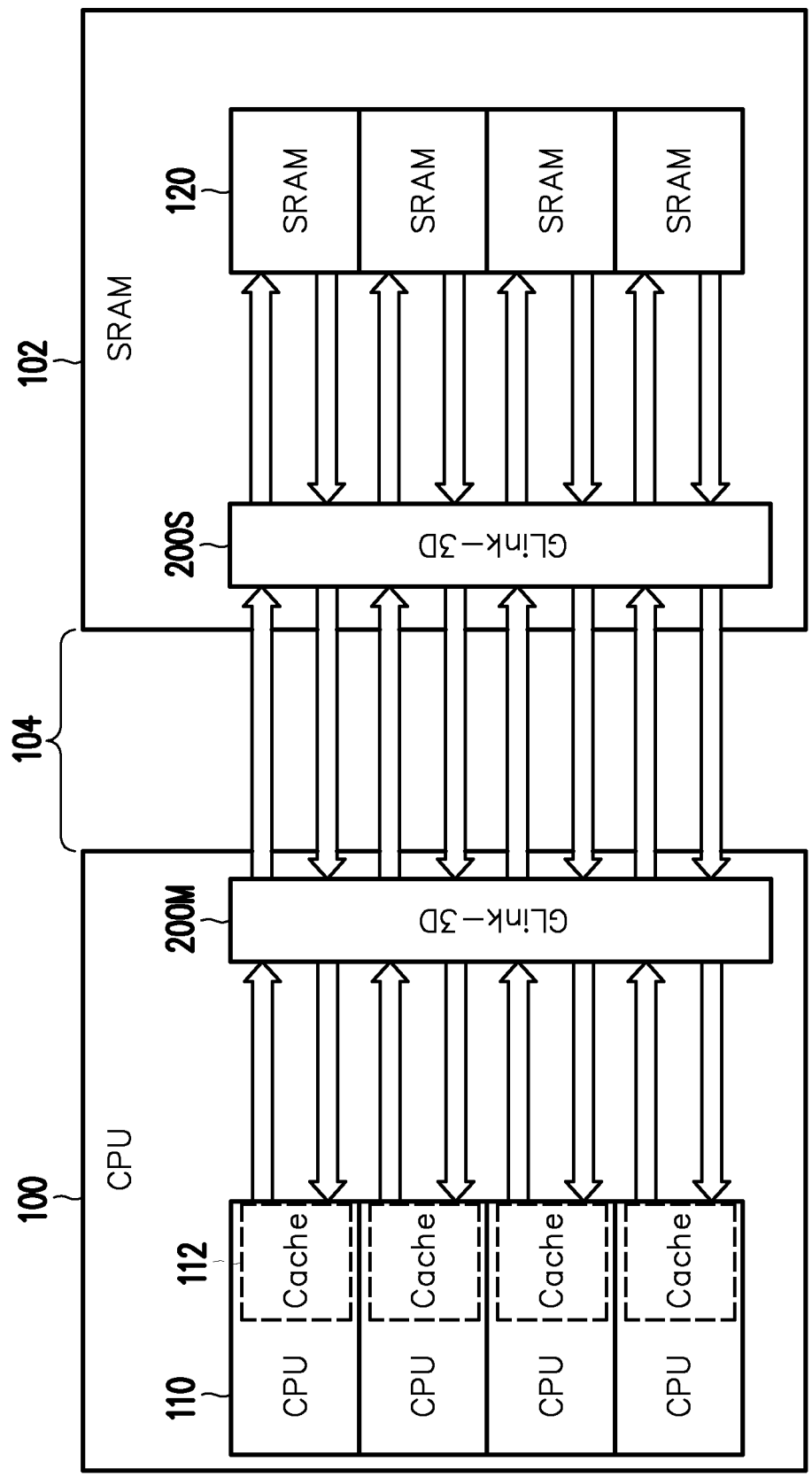
FIG. 4 is a drawing, schematically illustrating a communication mechanism of the interface between a master chip and a slave chip, according to an embodiment of the invention.

FIG. 4 is a drawing, schematically illustrating a communication mechanism of the interface between a master chip and a slave chip, according to an embodiment of the invention. Referring to FIG. 4, a communication mechanism between the master chip 100 with a master interface 200M and the slave chip 102 with a slave interface 200S through a bonding structure 104 in 3D package is described. The master interface 200M and the slave interface 200S form the interface 200 as stated in FIG. 3. Inside the master chip 100, the CPU blocks 110 with the cache blocks 112 in an example form a processor. The processor is connected to the master interface 200M to transmit or receive signals at the master interface 200M, as intended to communicate with the slave chip 102.

Inside of the slave chip 102, it also includes the SRAM blocks 120 and the slave interface 200S. The SRAM blocks 120 is connected to the slave interface 200S for communication with the master chip 100. IN communication the master interface 200M and the slave interface 200S are connected through the bonding structure 104. The bonding structure 104 may include the TSV with the hybrid bond pattern, depending on the packaging process. The connection is bi-way. The bond pattern may be corresponding to a data bus, generally. All signals are parallel transmitted or received. The clock rate may be 2.5 GHz in an example. The signal latency between the master chip 100 and the slave chip 102 through the interface of the master interface 200M and slave interface 200S is reliable and may be about 2 ns in one way as an example.

Figure 5:
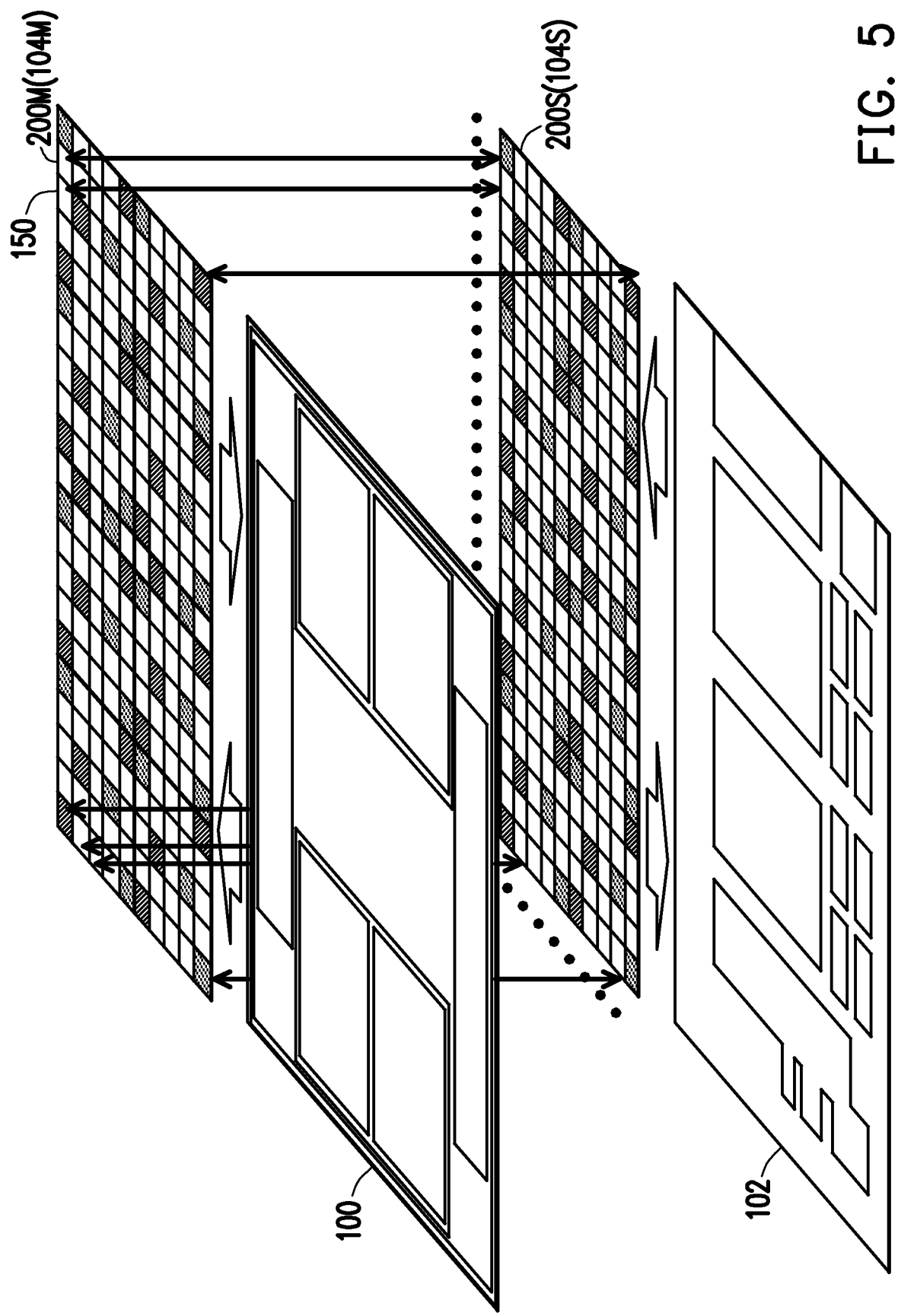
FIG. 5 is a drawing, schematically illustrating a 3D communication mechanism of the interface between a master chip and a slave chip, according to an embodiment of the invention.

FIG. 5 is a drawing, schematically illustrating a 3D communication mechanism of the interface between a master chip and a slave chip, according to an embodiment of the invention. Referring to FIG. 5, based on the operation mechanism as previously described, the master chip 100 and the slave chip 102 in 3D structure as an example is illustrated in better detail. The master chip 100, such as the processor, includes the master interface 200M, which including the bonding structure 104M. The bonding structure 104M in an example includes a bonds pattern, composed of a plurality of bonds in an example. As a result, depending on the data size of the bus, the bonds are formed as an array, in which one bonding tile 150 is corresponding to one group of binary data, such as 16-bit data with the voltage bond, clock bond, and other designated bonds. Multiple bonding tiles 150 form the whole bond pattern for the master interface 200M. As noted, the data from the processor is communicated in bi-direction with the master interface 200M.

Likewise, the slave chip 102 may include the SRAM and the slave interface 200S. The SRAM communicates with the slave interface 200S, and the slave interface 200S communicates with the master interface 200M through the connection of the bonding structure 104S, which is also composed of a plurality of bonds, each represented by one square unit, arranged in an array manner as a bond pattern. Likewise, the bond pattern is also divided into multiple bonding tiles 150. In the 3D packaging technology, the master interface 200M and the slave interface 200S are connected through the bonding structure 104M and the bonding structure 104S with the matched bond patterns. As a result, the master interface 200M and slave interface 200S are connected as a complete interface, based on the 3D packaging technology, to have communication between the master chip 100 and slave chip 102. As noted, multiple slave chips 102 are stacked on top of the master chip 100, in which the master interface 200M and the slave interfaces 200S are connected together in vertical direction.

Figure 6:
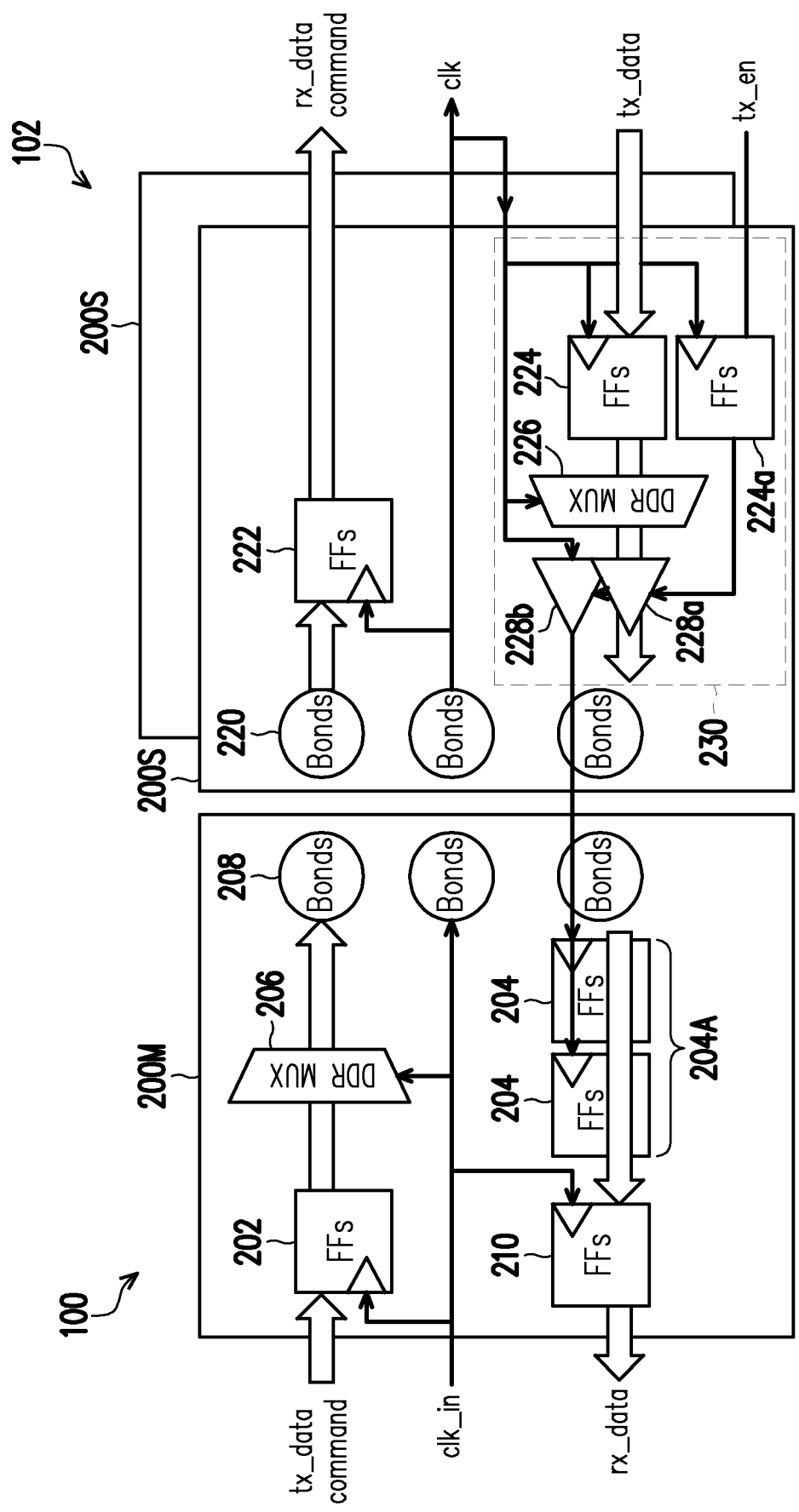
FIG. 6 is a drawing, schematically illustrating a circuit structure of the interface between a master chip and a slave chip, according to an embodiment of the invention.

The circuit for the master interface 200M and the slave interface 200S are described as follows. FIG. 6 is a drawing, schematically illustrating a circuit structure of the interface between a master chip and a slave chip, according to an embodiment of the invention.

Referring to FIG. 6, the master interface 200M of a master chip 100 and the slave interface 200S of a slave chip 102 are described with the circuit as implemented. As to the master interface 200M, it includes a flip-flop (FF) block 202 to receive a command as intended by the core circuit of the master chip 100. The command in an example as an input may include a cluster of data tx_data and/or command without specific limitation. The number of the flip-flop block 202 may be one unit (FF) or more unit (FFs) as actually need without limitation here. The command from the master chip 100 in an example may include command and the data cluster to be transmitted. The command may also include a selecting slave identification, which is used to select the slave chip 102 to perform the command from the master chip 100.

A multiplexer 206 receives the output of the flip-flop block 202. The multiplexer 206 in an example is a double data rate (DDR) type in accordance with the input data at the flip-flop block 202. The output of the multiplexer 206 is transmitted to the corresponding bonds of a bond pattern 208 in the master interface 200M.

As noted, the single clock, clk, is provided through the master interface 200M and the slave interface 200S into the slave chip 102. The flip-flop block 202 and the multiplexer 206 are controlled in timing by the clock clk_in. In the master interface 200M, the flip-flop block 202 and the master multiplexer 206 form a transmitting path, so to transmit command to the slave chip 102.

The master interface 200M also includes a receiving path to receive the response from the slave chip 102 through the slave interface 200S and the master interface 200M with the corresponding bond portion of the bond pattern 208. A first-in-first-out (FIFO) block 204A receives the response from the slave interface 200S. The FIFO block 204A in an example include multiple flip-flop units 204. The output of the FIFO block 204A is provided to another flip-flop block 210 and then inwardly transmitted into the core of the master chip 100. The flip-flop block 210 is controlled in timing by the clock clk_in. The FIFO block 204A is controlled by the feedback clock from the slave chip 102 with an enable control corresponding to the response data from the slave chip 102.

In an example of read operation, the command of the master chip 100 is received by the flip-flop block 202 of the master interface 200M. The slave chip 102 as selected responds the data as requested to the FIFO block 204A of the master interface 200M.

In the slave interface 200S of the chip 102, the bond pattern 220 is corresponding to the bond pattern 208. The command of the master chip 100 is then received by a flip-flop block 222, which is also control the clock clk. The flip-flop block 222 in the slave interface 200S then further transmit the command, such as rx_data and/or command, inward to the SRAM of the slave chip 102. In an example, the master chip 100 sends a command to read data from the SRAM of the slave chip 102.

Then, the slave chip 102 provides the data cluster as requested from the master chip 100, also indicated by tx_data to the slave chip 102 in an example, into the circuit bock 230. The circuit block 230 is also controlled by the clock clk and an enable signal, tx_en. The circuit block 230 includes a flip-flop block 224, an enable flip-flop block 224a, a slave multiplexer 226, and an output control block 228a, 228b.

The clock signal clk in each slave interface 200S for control is also provided to the third flip-flop block 222, the fourth flip-flop block 224, the slave multiplexer 226, the enable flip-flop block 224a, and the output control block 228a.

The flip-flop block 224 outputs the data to the slave multiplexer 226 and then the output control block 228b. The enable flip-flop block 224a receives an enable signal; tx_en and the clock signal clk and provides a control signal to control the output control block 228a. Then the data as provided by the slave chip 102 is transmitted to the master chip 100 through a bond portion of the bond pattern 220.

To have the proper timing control of the clock signal clk to respond to the master chip 100, another output control block 228b also receives the original clock clk and control by the enable signal from the enable flip-flop block 224a.

The data output from the slave interface 200S is then received by the FIFO bock 204A in the master interface 200M. To the master interface 200M, the data rx_data are the response from the slave chip 102 with respect to the command, such as command.

In an embodiment, there are a number of the slave chips 102 stacked over the master chip 100. The command from the master chip 100 is sent to all of the slave chips 102. In this situation, the command of the master chip 100 also includes a selecting slave identification, which is used to select the slave chip 102 to perform the command from the master chip 100. The slave interface 200S also include the capability to recognize the selecting slave identification code. Each of the slave interface 200S has its own identification code. The one of the slave interface 200S matching to the selecting slave identification code would be activated to respond the command from the master chip 100 at the time slot allocated by the master command. The interference between the slave chips may be effectively avoided.

Figure 7:
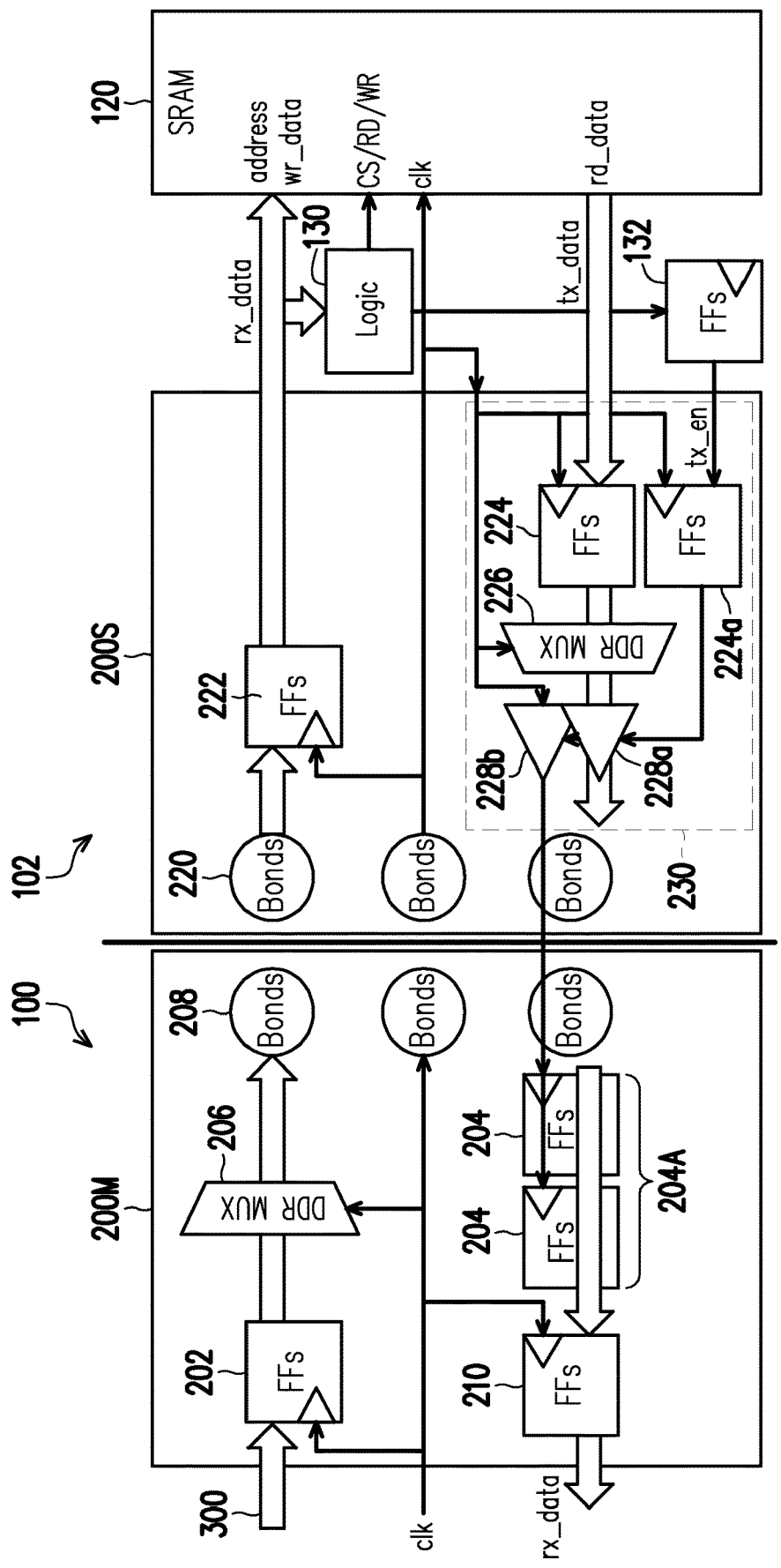
FIG. 7 is a drawing, schematically illustrating a circuit structure of the interface between a master chip and a slave chip, according to an embodiment of the invention.

FIG. 7 is a drawing, schematically illustrating a circuit structure of the interface between a master chip and a slave chip, further according to an embodiment of the invention. Referring to FIG. 7, the connection between the slave interface 200S and the SRAM 120 in an example is further described.

The command 300 may include command, address, write data and the selecting slave identification, in an example. The data rx_data from the flip-flop block 222 of the slave interface 200S is output to the SRAM 120. However, the slave interface 200S may further include a logic circuit 130 and a fifth flip-flop block 132. The logic circuit 130 also receives the command, such as the data rx_data, outputting from the third flip-flop block 222 to determine a type signal of command/read_data/write_data (CS/RD/WR) and also produce a preliminary enable signal to the fifth flip-flop block 132, the fifth flip-flop block 132 accordingly output the enable signal to the enable flip-flop block 224a. The SRAM 120 receives the type signal of CS/RD/WR to respond the command from the master chip 100. Once the slave chip 102, such as the SRAM 120 finishes the command, a result such as the data rd_data for reading command is responded to the slave interface 200S as the input data tx_data for the slave interface 200S.

As further noted, in the structure of the invention including the interface in connecting to multiple slave chips 102, such as 16 slave chips, the write command and the read command may be overlapping and then executed simultaneously. The size of the data bus may have 256 bits in addition with some reserved bits. The master bond pattern 208 and slave bond pattern 220 have the number of bonds as needed in the master interface 200M and the slave interface 200S to transmit the data signals, which are grouped into multiple bonding tiles 150S, 150M as shown in next FIG. 8. In addition, the bonding tile 170 shown in FIG. 8 may also be included for transmitting the other control signals for actual operation.

Since the 3D packaging technology allows multiple chips to stack up, in which the bonds located at the face surface of the chip. However, the TSV structure is included to extend the bonds at the face surface to the back surface of the chip. To the stacked chips, two chips may be electric connected at the bond patters by face-to-face manner or face-to-back manner as the choices.

Figure 8:
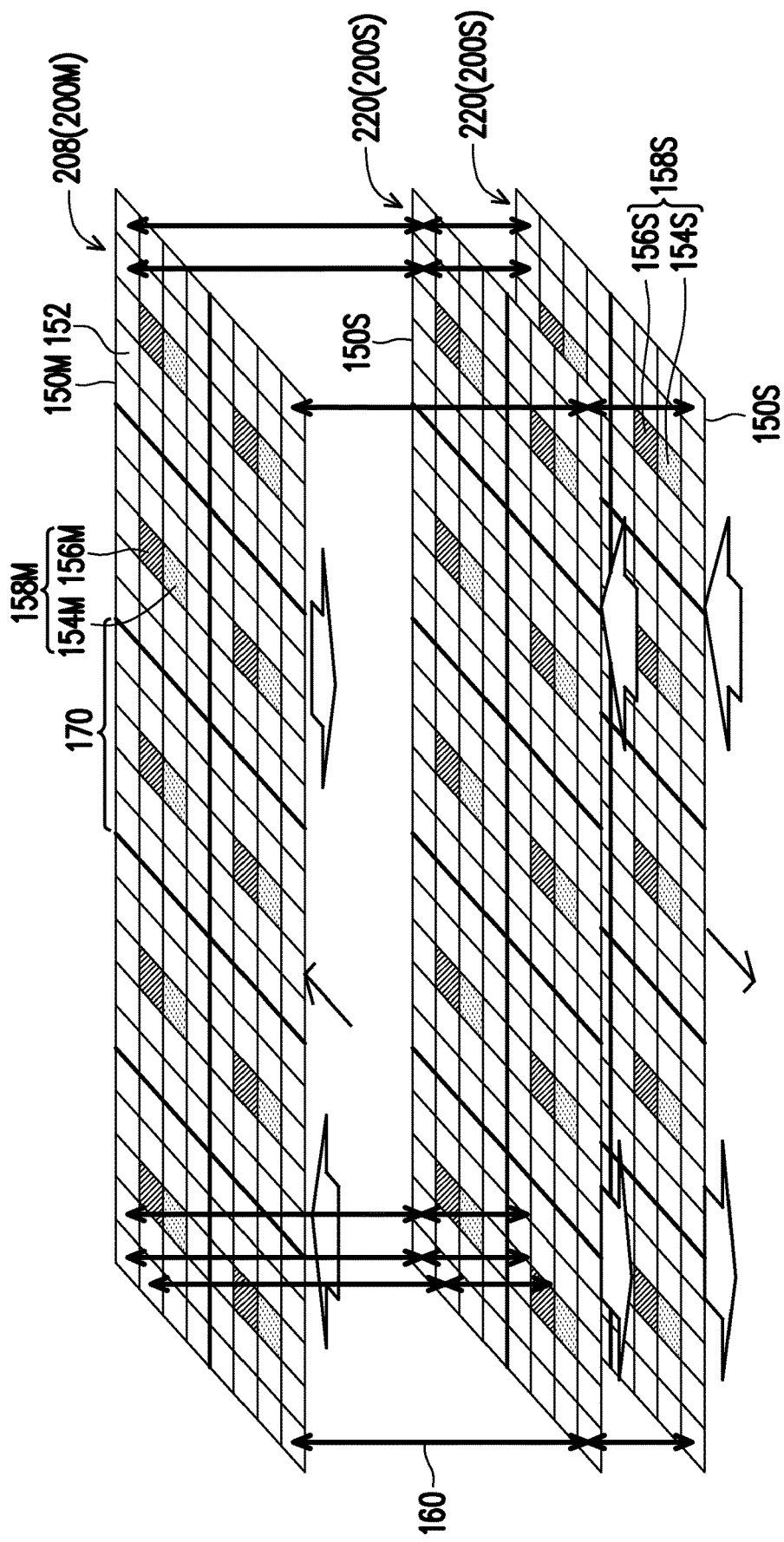
FIG. 8 is a drawing, schematically illustrating the communication mechanism of the interface with bond pattern, according to an embodiment of the invention.

FIG. 8 is a drawing, schematically illustrating the communication mechanism of the interface with bond pattern, according to an embodiment of the invention. Referring to FIG. 8 and also referring to FIG. 5, the master bond pattern 208 of the master interface 200M includes a plurality of bonds 152. The bonds 152 in an embodiment may be grouped into multiple bonding tiles 150 seen in FIG. 5, in which the bonding tiles 150 belonging to the master interface 200M may also be referred as the bonding tile 150M while bonding tiles 150 belonging to the slave interface 200S may also be referred as the bonding tile 150S. Taking the bonding tile 150M as an example for descriptions, one bond tile 150M include a group of bonds, which is used to transmit a set of data signals, voltage signals, data parity signal and control signals in an example. The data signals in an example includes 16-bit data but is not limited to. The voltage bonds 154M, 156M may include system high voltage such VDD and the ground voltage such VSS. The bonds with constant function transmitting voltage signals, data parity signal and control signals may be referred to the functional bonds 158M, which include the voltage bonds 154M, 156M and are located at a central row in one bond tile 150M. In other words, one bond tile 150S may include a central row of bonds with the functional bonds 158S, which include the voltage bonds 154S, 156S. The data bonds 152 for transmitting data signals may divided into two parts of data rows, which in geometric location are symmetric with respect to the central row. The detail would be described later.

Depending on the operation of the interface, the bonding tile 170 may be also included for transmitting or receiving various control signals as needed in operation between the master chip 100 and the slave chip 102, in which the clock signal as indicated by thin arrows may be included in the bonding tile 170 for transmitting or receiving, in an embodiment. The arrow 160 represents the vertical connection at the bond pattern 208 of the master interface 200M and the bond pattern 220 of the slave interfaces 200S for communication between the master chip 100 and the slave chip 102 through the bond pattern 208 in the master interface 200M and the bond pattern 220 in the slave interface 200S. To the master interface 200M, the inward thick arrow represents the command issued from the master device, such as processor. The commands are transmitted vertically downward to the slave device through bond pattern 208 of the master interface 200M and the bond pattern 220 of the slave interface 200S. The output thick arrow represents the command is transmitted to the slave device, such as the SRAM. The slave interface 200S then receives the data from the slave device according to the command and then transmit to the master interface 200M, which is provide the data to master device as indicated by thick arrow with the output direction.

The bond tile 150M, 150S are configured to have the central row and the data rows in two parts at two sides of the central row in symmetric locations. This configuration of the bonds may allow to easily package the master chip with the multiple slave chips by the ways of face-to-face, face-to-back and back-to-back, in which bonds of the bond pattern 208, 220 may be flipped or not flipped to adapt the ways of face-to-face, face-to-back, or back-to-back.

Figure 9:
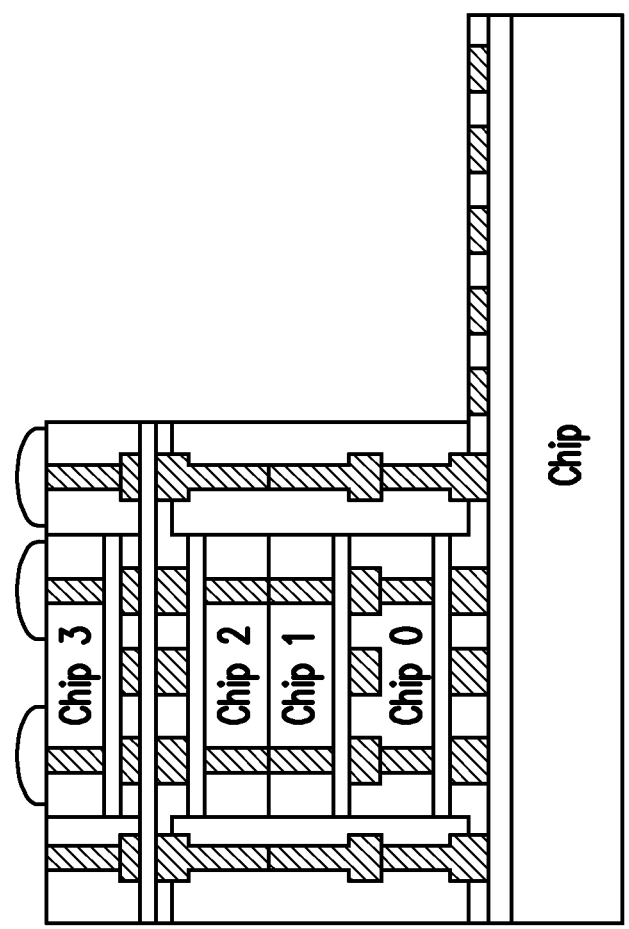
FIG. 9 is a drawing, schematically illustrating the 3D packaging structure of the master chip and the slave chips by face-to-face, face-to-back and back-to-back, according to an embodiment of the invention.

FIG. 9 is a drawing, schematically illustrating the 3D packaging structure of the master chip and the slave chips by face-to-face, face-to-back and back-to-back, according to an embodiment of the invention. Referring to FIG. 9, a 3D package structure in an example includes a master chip as indicate chip and multiple slave chips, as indicated by chip 0, chip 1, chip 2, and chip 3 as an example. Here, some slave chips 0-3 as shown are just the example but the invention is not limited to. The master chip may adapt more other chips in different area without limiting to the embodiment in FIG. 9 In the example, the connection between the master chip and the slave chip 0 is face-to-face, the connection between the slave chip 0 and the slave chip 1 is face-to-back, the connection between the slave chip 1 and the slave chip 2 is back-to-back, and the between the slave chip 2 and the slave chip 3 is face-to-face. However, the invention is not just limited to the example.

Due to the configuration of the data bonds in the bond tiles as foregoing descriptions, the data bonds are symmetric to the central row. In fabrication, the data bonds may be freely connected between the bond pattern 208 and the bond pattern 220 while the two central rows of the bond pattern 208 and the bond pattern 220 are aligned and connected. The data bonds of the bond pattern 208 of the master interface 200M may be mapped to the data bonds of the bond pattern 220 of the slave interface 200S by MUX, in an example, during operation. In this situation, the bonds of the bond pattern 208, 220 may be arranged in a compact way and may adapt the way of face-to-face, face-to-back and back-to-back.

Figure 10:
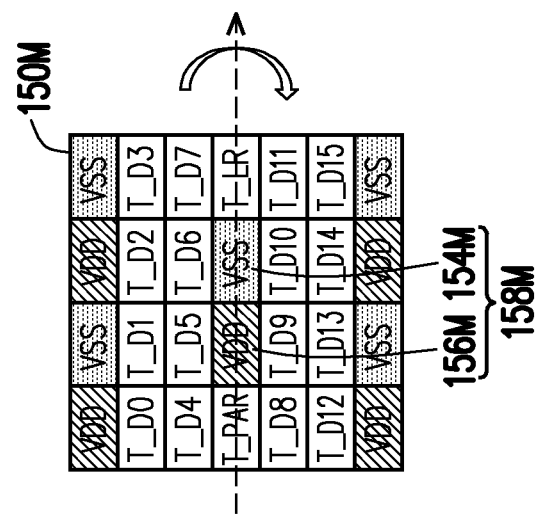
FIG. 10 is a drawing, schematically illustrating arrangement of bonds for a group of bonds as a bonding tile corresponding to master interface, according to an embodiment of the invention.

FIG. 10 is a drawing, schematically illustrating arrangement of bonds for a group of bonds as a bonding tile corresponding to master interface, according to an embodiment of the invention. Referring to FIG. 10, taking the bond tile 150M as an example for detail, the voltage bond 154M for VSS and another voltage bond 156M in an embodiment are a part of the function bonds 158M, being set at the central row of the bond tile 150M. In addition, depending on the actual need in an embodiment, the voltage bonds of VDD and VSS may be set at the peripheral row. The central row may also include the data parity, T_PAR and a redundant bond, T_LR. However, the voltage bonds of VDD and VSS at the central row may be replaced by other signals while the voltage bonds are set at the peripheral row. The invention is not specifically limited to the embodiment. The bonds arranged in the central row are the general signals other than the data signals. The central row serves as a symmetric axis. The data bonds are at two side of the central row and are in symmetric location. As result, the structure may remain the same when bond tile 150M is flipped along the symmetric axis. In other words, the bonds at the central row are not changed when the bond tile 150M is flipped. However, the location of data bonds T_D0 to T_D15 in two parts are exchanged when the bond tile 150M is flipped. The flip case may be taken to adapt a face-to-back stacking structure, in an embodiment. The data bonds may be connected to connect to the bond tile 150S by straight connection or flip connection, in which a MUX may be involved to map the data in connection.

Figure 11:
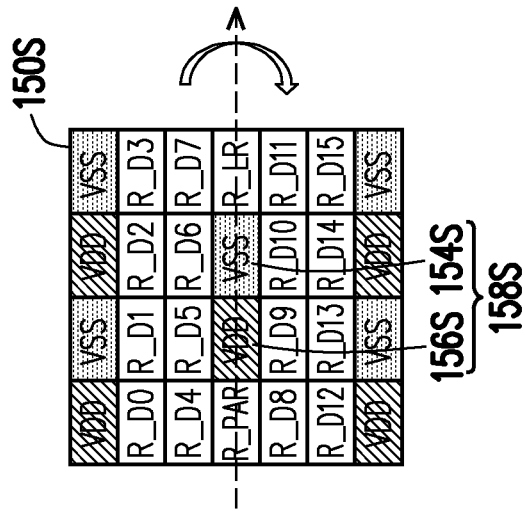
FIG. 11 is a drawing, schematically illustrating arrangement of bonds for a group of bonds as a bonding tile corresponding to slave interface, according to an embodiment of the invention.

FIG. 11 is a drawing, schematically illustrating arrangement of bonds for a group of bonds as a bonding tile corresponding to slave interface, according to an embodiment of the invention. Referring to FIG. 11, to the bond tile 150S for the slave interface 200S, it is similar to the bond tile 150M for the master interface 200M in FIG. 10. The functional bonds are located at the central row or in addition at the peripheral row. As a result, the functional bonds may be the globally locate at the same location and may be straightly connected. The data bonds would be changed when flip the chip up side down. However, the bonds as configured in the invention may be helpful for adapting the stacking structure, easily.

In addition, the definition of the data bonds is just an example, depending to the data to be transmitted or received from the master device or the slave device. The number of bits to be transmitted or received in one bond tile is 16 as an example but not the limitation. To have the symmetric data rows with respect to the central row, the number of the bond rows totally in one bond tile is an odd number. In the embodiment, the bond tile includes 7 bond rows with the central row not being changed when flipping the bond tile.

Figure 12:
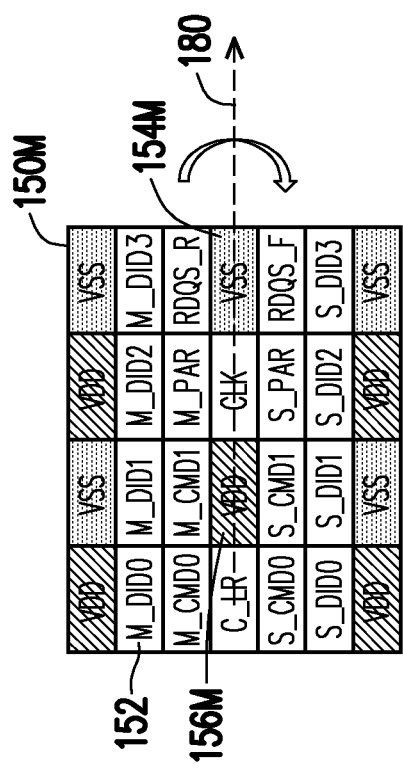
FIG. 12 is a drawing, schematically illustrating arrangement of voltage bonds in a bonding tile, according to an embodiment of the invention.

FIG. 12 is a drawing, schematically illustrating arrangement of voltage bonds in a bonding tile, according to an embodiment of the invention. Referring to FIG. 12, in an embodiment to define the bonds, a bond tile 150M with 28 bonds as an array is shown, in which 10 voltage bonds are involved. The definition of the bonds is listed in Table 1 as an example. As configured, 28 bonds for various signals are involved in one bond tile. In an embodiment, the voltage bonds VSS, VDD are distributed in the central row and the peripheral rows. The central row is serving as the symmetric axis and further includes the redundant bond, C_LR and the clock, CLK are set in the central row. The command, data, parity and chip ID are set in being symmetrical. However, the definition of the bonds is not limited to the embodiment as provided for description.

TABLE 1

| Bonds | Number of Bonds | Direction | Functionality |
|---|---|---|---|
| Master Command, M-CMD[1:0] | 2 | M->S | Command Symmetrical |
| Master to Slave chip ID, M_DD[3:0] | 4 | M->S | Chip ID: Symmetrical |
| Master Command Parity, M_PAR | 1 | M->S | Parity: Symmetrical |
| Slave Commend, S_CMD [1:0] | 2 | M->S | Command: Symmetrical |
| Slave to Master chip ID, S_DID[3:0] | 4 | M->S | Chip ID: Symmetrical |
| Slave Command Parity, S_PAR | 1 | M->S | Parity: Symmetrical |
| Redundant Bond, LR | 1 | M->S | Redundant: Central row |
| Clock, CLK | 1 | M->S | Clock: Central row |
| Read DQS, RDQS_R/F | 2 | S->M | Read DQS: Symmetrical |

Figure 13:
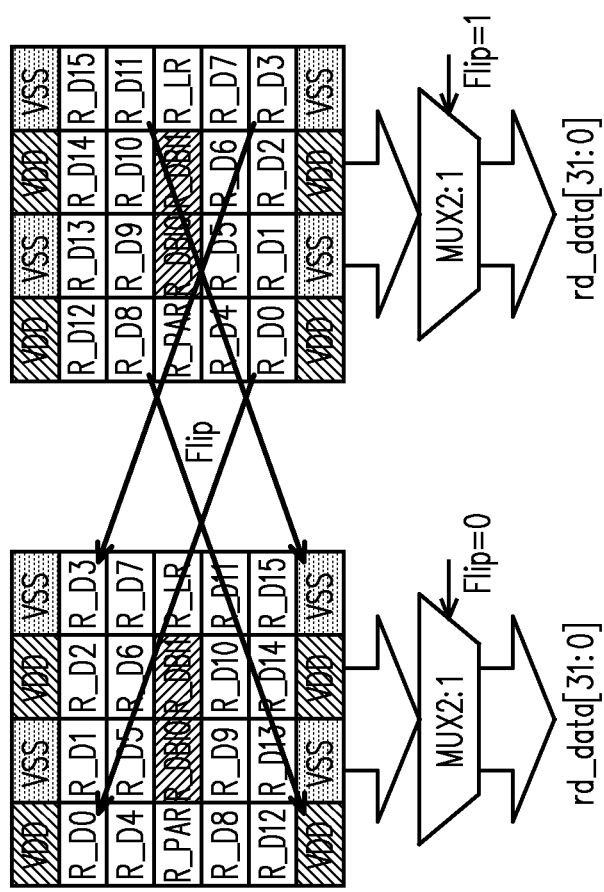
FIG. 13 is a drawing, schematically illustrating an output mechanism for a bonding tile with flip control, according to an embodiment of the invention.

FIG. 13 is a drawing, schematically illustrating an output mechanism for a bonding tile with flip control, according to an embodiment of the invention. Referring to FIG. 13, the flip mechanism for the slave interface to transmit the read data is described. The bond locations of the left bond tile are the condition without flip or the straight state and the bond locations of the right bond tile are at the flipped state as needed in packaging process. Taking the data bonds R_D0 to R_D15 as an example, the data bonds R_D0 to R_D15 are arranged to have the symmetrical property. When the left bond tile is flipped as shown in the right bond tile, the lower part of the data bonds R_D0 to R_D7 in the right bond tile is corresponding to the upper part of the data bonds R_D0 to R_D7 in the left bond tile. Likewise, the upper part of the data bonds R_D8 to R_D15 in the right bond tile is corresponding to the lower part of the data bonds R_D8 to R_D15 in the left bond tile. The voltage bonds VDD and VSS are not changed. The functional bonds at the central row is not changed when flipping.

In an embodiment, to have proper output data from slave device, the output side of the master/slave interface may be further implemented with a flipping multiplexer MUX with 2:1 multiplexing capability for outputting data in accordance with the flipped state or the straight state. The control signal Flip is set to Flip=0 for straight output. The control signal Flip is set to Flip=1 for flipped output.

In an example, the bonds are defined in different assignment according to whether flipping or not. Table 2 shows the defined bonds in relation to the original data bits when the straight view or the flipped view.

TABLE 2

| Original data bits | Flip = 0<br>Straight view | Flip = 1<br>Flipped view |
| --- | --- | --- |
| R_D0 | R_D0 | R_D12 |
| R_D1 | R_D1 | R_D13 |
| R_D2 | R_D2 | R_D14 |
| R_D3 | R_D3 | R_D15 |
| R_D4 | R_D4 | R_D8 |
| R_D5 | R_D5 | R_D9 |
| R_D6 | R_D6 | R_D10 |
| R_D7 | R_D7 | R_D11 |
| R_D8 | R_D8 | R_D4 |
| R_D9 | R_D9 | R_D5 |
| R_D10 | R_D10 | R_D6 |
| R_D11 | R_D11 | R_D7 |
| R_D12 | R_D12 | R_D0 |
| R_D13 | R_D13 | R_D1 |
| R_D14 | R_D14 | R_D2 |
| R_D15 | R_D15 | R_D3 |

Figure 14:
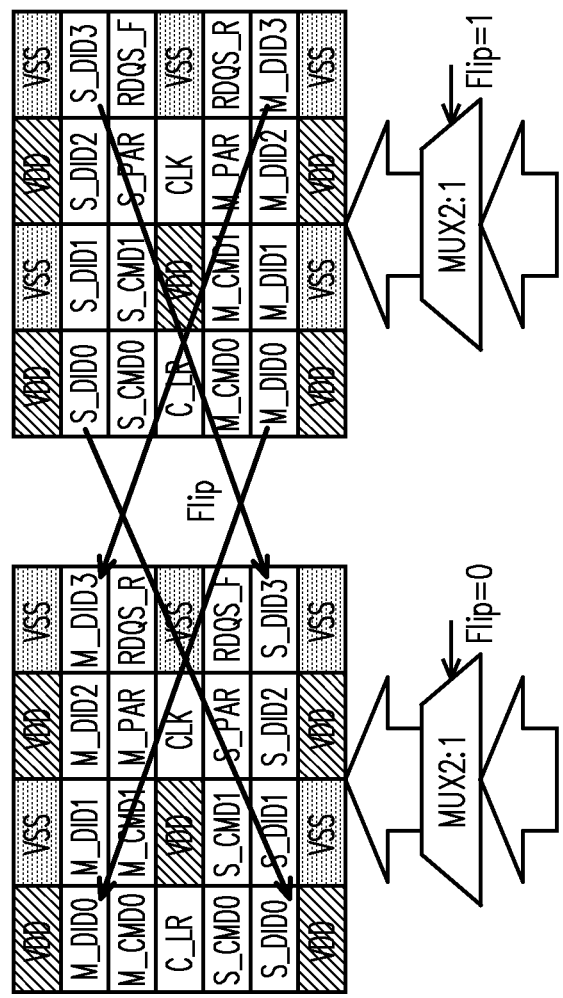
FIG. 14 is a drawing, schematically illustrating an input mechanism for a bonding tile with flip control, according to an embodiment of the invention.

FIG. 14 is a drawing, schematically illustrating an input mechanism for a bonding tile with flip control, according to an embodiment of the invention. Referring to FIG. 14, for the different type of bond tile in an example of FIG. 12, the left bond tile is the straight state to transmit the command form the master device. However, if the flip state is needed to adapt the packaging process the upper bonds in the right bond tile are corresponding to the lower bonds in the left bond tile and the lower bonds in the right bond tile are corresponding to the upper bonds in the left bond tile. The flipping multiplex at the input side is set to Flip=0 for the left bond tile and Flip=1 for the right bond tile. As noted, the bonds as defined may be changed according to actual need, not limited to the embodiment.

Figure 15:
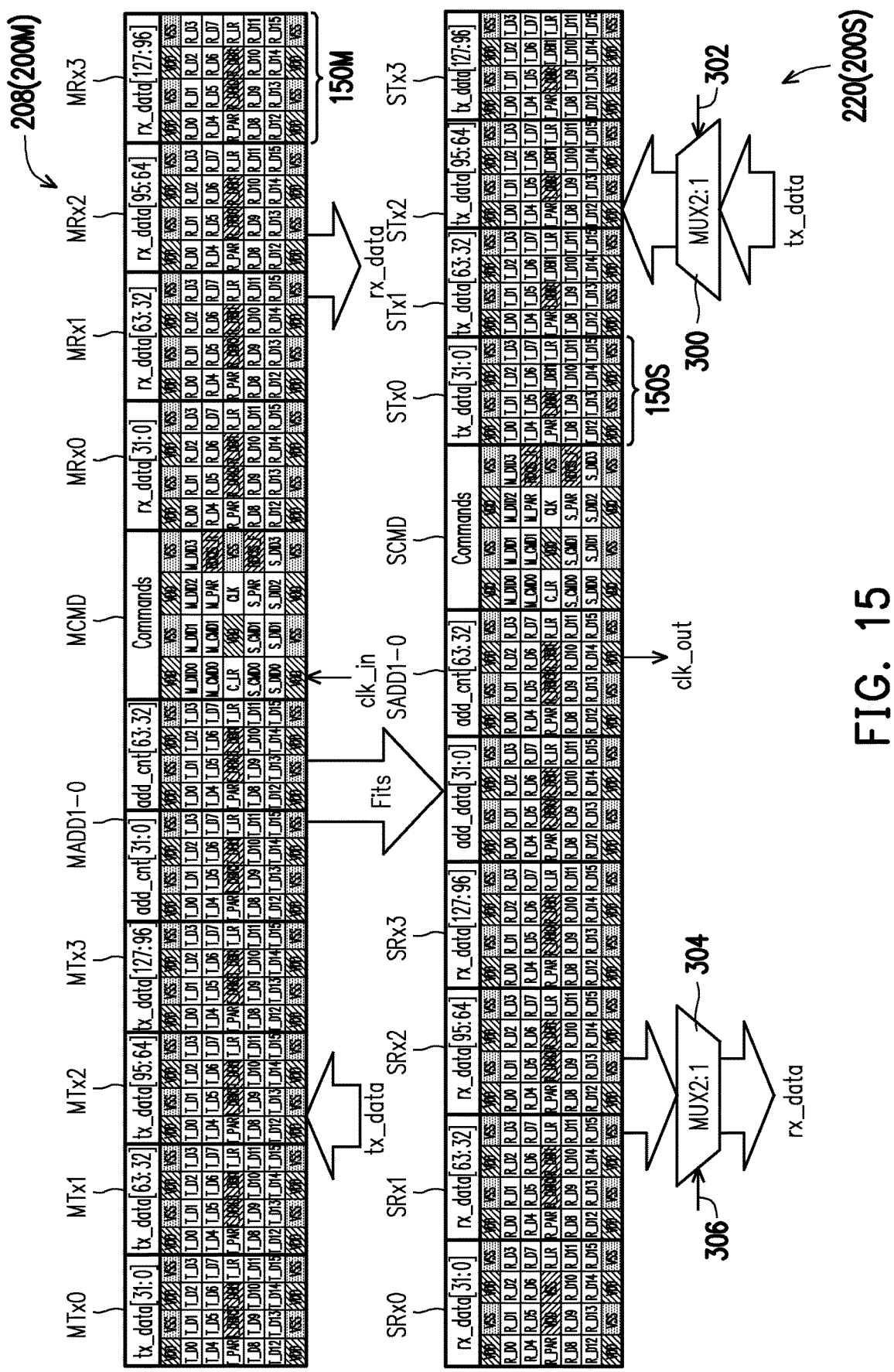
FIG. 15 is a drawing, schematically illustrating bonding structures involved in data communication between the master interface and the slave interface in straight way of the slave bonding structure, according to an embodiment of the invention.

FIG. 15 is a drawing, schematically illustrating bonding structures involved in data communication between the master interface and the slave interface in straight way of the slave bonding structure, according to an embodiment of the invention. Referring to FIG. 15, it is the straight view for the bond pattern in straight connection. Taking the data size in 128 bits as an example to be transmitted between the master device and the slave device, the bond pattern 208 of the master interface 200M and the bond patterns 220 of the slave interface 200S may include multiple bond tiles to transmit various command data, operation voltages, the data in bit, and so on. The bonds in the bond pattern 208 and the bonds pattern 220 are fitted.

The master device intends to transmit the data as indicated tx_data to the slave device. In the case of the straight view without flip of the bonds, a flipping multiplexer 304 is controlled by the control signal 306 to set at the state of Flip=0. Likewise, the data tx_data as responded from the slave device, such as SRAM, may first pass the flipping multiplexer 300, of which the control signal 302 is set at the state of Flip=0 as well. The data would return to the master circuit of the master device.

Figure 16:
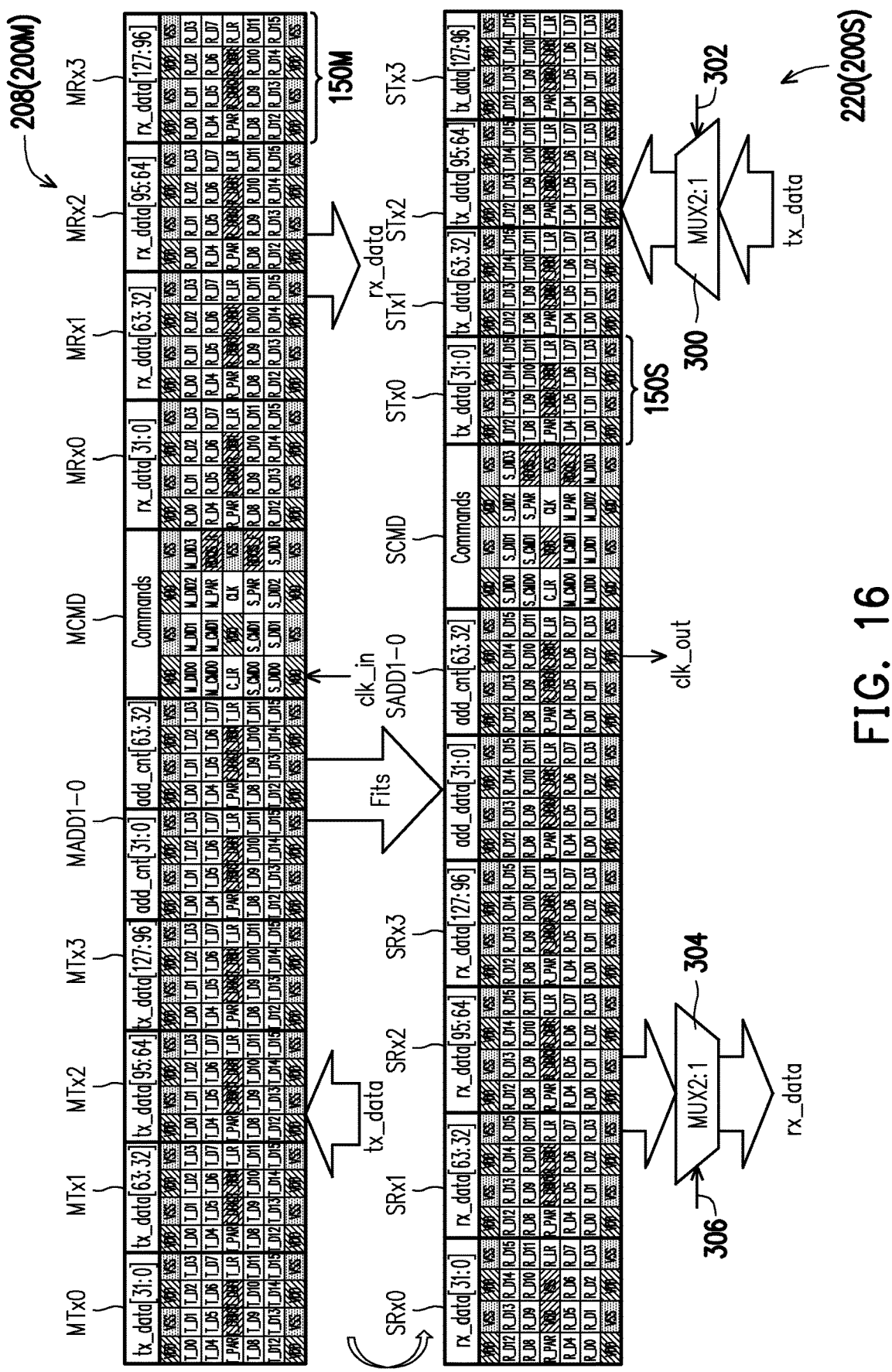
FIG. 16 is a drawing, schematically illustrating bonding structures involved in data communication between the master interface and the slave interface in a flip way of the slave bonding structure with respect to FIG. 15, according to an embodiment of the invention.

FIG. 16 is a drawing, schematically illustrating bonding structures involved in data communication between the master interface and the slave interface in a flip way of the slave bonding structure with respect to FIG. 15, according to an embodiment of the invention.

Referring to FIG. 16 as an example, when a slave chip is stacked on the master chip with the need to flip the bond pattern of the slave interface 200S, the bonds in the bond pattern 220 is flipped. As foregoing description about the flipping mechanism, the bond definition is flipped. However, the original data bit from the slave device needs to be flipped by the flipping multiplexer 300, 304, in which the control signals 302, 306 are set to the state Flip=1 in accordance with the flipped bond patterns.

As a result, the chip may be stacked up by the ways of face-to-face, back-to-back or face-to-back, in which the flipped bond pattern is flexibly redefined. As noted, a portion of the bonds including the voltage bonds, parity bonds and so on is not necessary to be flipped.

Figure 17:
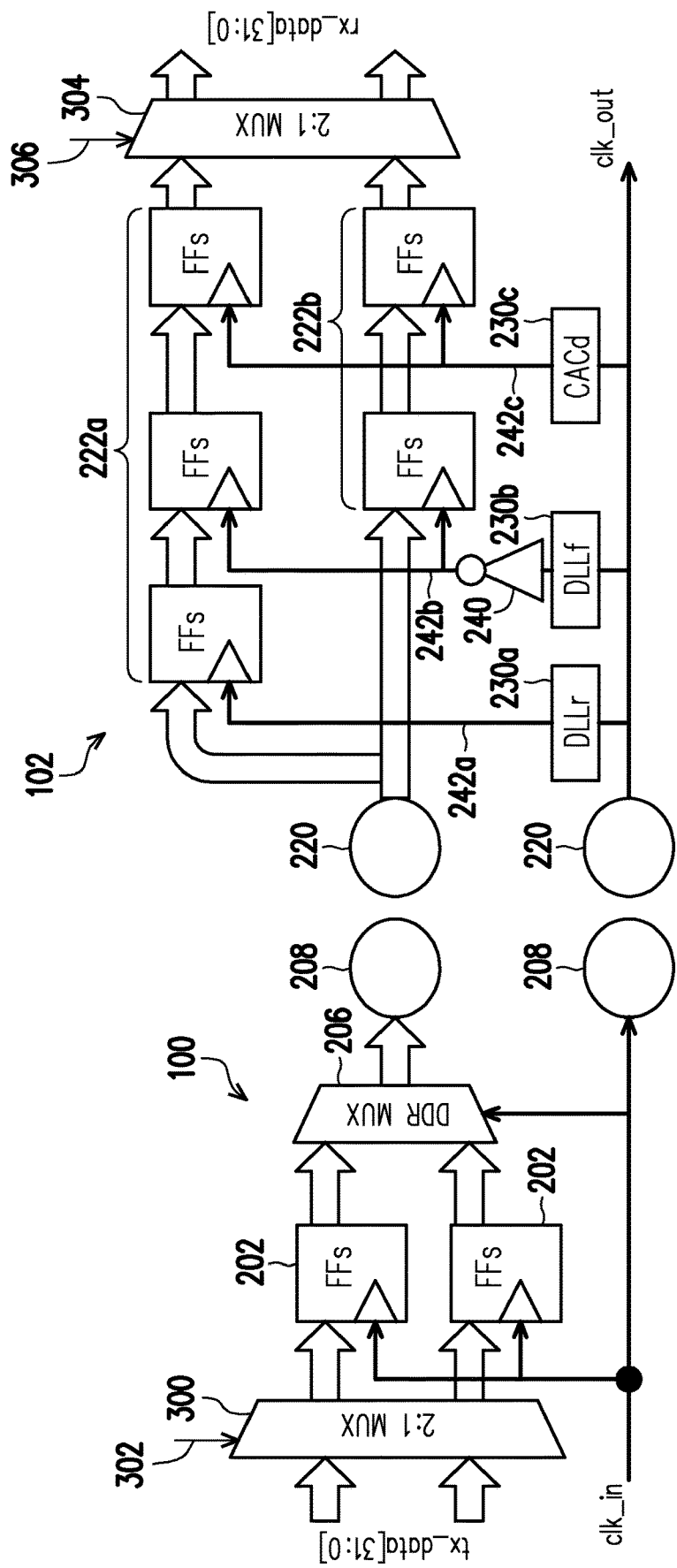
FIG. 17 is a drawing, schematically illustrating a circuit structure of the interface with combination of the DDR mechanism and the flip mechanism, according to an embodiment of the invention.

FIG. 17 is a drawing, schematically illustrating a circuit structure of the interface with combination of the DDR mechanism and the flip mechanism, according to an embodiment of the invention.

Referring to FIG. 17 and also FIG. 7, for one command data, such as tx_data[31:0], from the master chip 100, the data tx_data as the command in an example may include 32-bit data. The data tx_data is firstly controlled by the flipping multiplexer 300.

For the further operation based on DDR mechanism, in the embodiment, the 32-bit data may be divided into two set of 16-bit data, which are respectively input to the flip-flop block 202. The master multiplexer 206 is operated under the DDR mechanism as well. After the command data tx_data is transmitted to the slave chip 102, the two part of the data are respectively entering the flip-flop block 222a and the flip-flop block 222b in two paths. The flip-flop block 222a and the flip-flop block 222b are corresponding to the flip-flop block 222 in FIG. 6. The clock clk also control the flip-flop block 222a and the flip-flop block 222b.

However, to properly decode the data cluster, that is also referred to a data eye due to a shape of data cluster as conventionally represented in a data train being like an eye shape, several delay lock loop (DLL) blocks can be used, such as DLLr 230a and DLLf 230b as indicated. In addition, a delay control unit 230c as indicated by CACd 230c is also used to modify the clock clk to control the flip-flop blocks 222a, 222b. Then, the bits in the data cluster are decoded correctly. Due to the DDR mechanism, an inverter 240 is used to invert the voltage level at the DLLf 230b, before providing to the flip-flop blocks 222a, 222b. The DDR bus then provides the data rx_data in the slave interface 200S of the slave chip 102.

To output from the slave chip 102 in accordance with the stacking up of the chips, the flipping multiplexer 304 is also included in an example to convert the flipped operation, so as to obtain the data rx_data to enter the slave chip as staked. In other words, flipping multiplexer may be auxiliary implemented to adapt the flip bond pattern for properly mapping the connection for the data bonds.

As further noted, in an embodiment, the flipping multiplexer 300 and the flipping multiplexer 304 are used to map the data bonds into the original sequence in accordance with the stack manner. In an embodiment, the two multiplexers 300, 304 may just be set in the slave interface 200S only because every slave chip can be flipped or not flipped. The slave chip knows whether or not it is flipped and it can set FLIP control of the multiplexer, accordingly. In an example as further modified in implementation, the slave interface 200S may include a flip multiplexer 300 at an input side to locate the two parts of the input data rows. The slave interface 200S then further includes another flip multiplexer 304 at an output side to locate the two parts of the output data rows.

Figure 18:
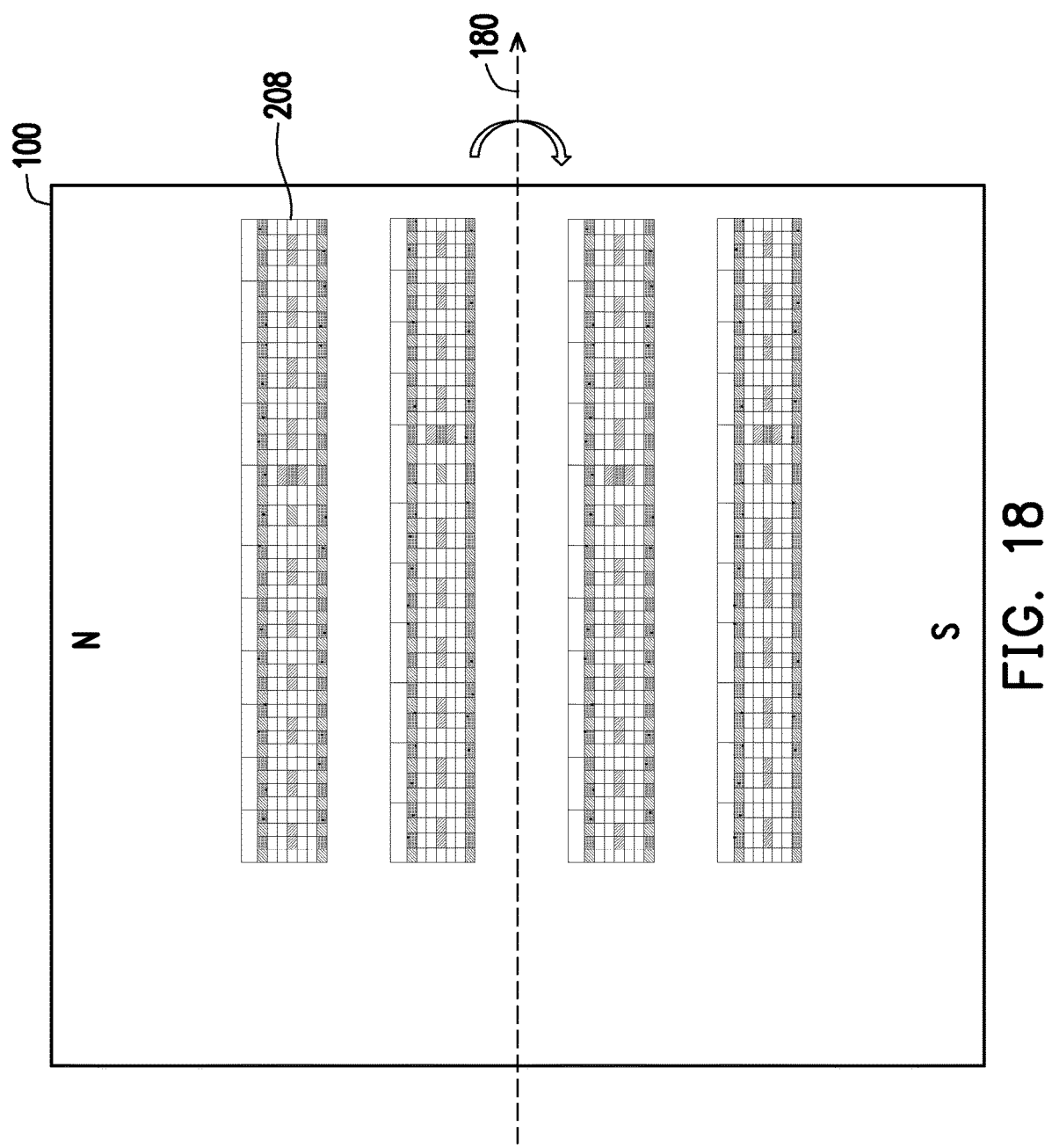
FIG. 18 is a drawing, schematically a flip application of the whole chip with respect to the X-axis, according to an embodiment of the invention.

In further view of the whole bond pattern with flip property, the flipping axis may be the X axis or the Y-axis. FIG. 18 is a drawing, schematically a flip application of the whole chip with respect to the X-axis, according to an embodiment of the invention. FIG. 19 is a drawing, schematically a flip application of the whole chip with respect to the Y-axis, according to an embodiment of the invention.

Referring to FIG. 18, the symmetric axis 180 may be the X-axis as the horizontal axis. The bond pattern with multiple bond tiles are extend along the symmetric axis 180. Taking the bond patterns 208 of the master chip 100 as an example, the bond patterns 208 in the south side S are symmetric to the bond patterns in the north side N, and then may be flipped based on the flipping mechanism as foregoing descriptions. Referring to FIG. 19, in another configuration, the symmetric axis 192 may be set as the Y-axis, which extends along the south side S to the north side N. then, the bons patterns 208 may be flipped between the east and west with respect to the symmetric axis 192.

According to the foregoing descriptions, in an embodiment, the invention provides an interface for a semiconductor device, the semiconductor device including a master device and a plurality of slave devices. The interface includes a master interface and a slave interface for each slave devices. The master interface is implemented in the master device and includes a master bond pattern of master bonds arranged as a first array. The slave interface is implemented in each of the slave devices and includes a slave bond pattern of slave bonds arranged as a second array. The first array of the master bonds includes a first central row and first data rows in two parts being symmetric to the first central row. The second array of the slave bonds includes a second central row and second data rows in two parts being symmetric to the second central row. The first central row and the second central row are aligned in connection, and the first data rows are connected to the second data rows.

In an embodiment, the invention also provides a method for arranging an interface for a semiconductor device, the semiconductor device including a master device and a plurality of slave devices, the method comprising providing a master interface, implemented in the master device and including a master bond pattern of master bonds arranged as a first array; and providing a slave interface, implemented in each of the slave devices and including a slave bond pattern of slave bonds arranged as a second array. The first array of the master bonds as arranged includes a first central row and first data rows in two parts being symmetric to the first central row. The second array of the slave bonds as arranged includes a second central row and second data rows in two parts being symmetric to the second central row. The first central row and the second central row are aligned in connection, and the first data rows are connected to the second data rows.

The configuration of the data bonds is symmetric to the symmetric axis. In these features of the bond patterns, the data bonds may be easily flipped in adapting the 3D stacking structure in packaging process. To further control the data bonds in flip operation, the flipping multiplexer may also be implemented in the interface to adapt the operation of whether flipping the bonds or not to allow the chips to be stacked by face-to-face, back-to-back, or face-to back in various ways.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An interface for a semiconductor device, the semiconductor device including a master device and a plurality of slave devices, the interface comprising:
   a master interface, implemented in the master device and including a master bond pattern of master bonds arranged as a first array; and
   a slave interface, implemented in each of the slave devices and including a slave bond pattern of slave bonds arranged as a second array;
   wherein the first array of the master bonds includes a first central row and first data rows in two parts being symmetric to the first central row,
   wherein the second array of the slave bonds includes a second central row and second data rows in two parts being symmetric to the second central row,
   wherein the first central row and the second central row are aligned in connection, and the first data rows are connected to the second data rows.

2. The interface of the semiconductor device in claim 1, wherein the first array further includes two peripheral rows being symmetric to the first central row, wherein the second array further includes two peripheral rows being symmetric to the second central row.

3. The interface of the semiconductor device in claim 1, wherein the slave interface further includes a first flip multiplexer at an input side to locate the two parts of the first data rows, and
   wherein the slave interface further includes a second flip multiplexer at an output side to locate the two parts of the second data rows.

4. The interface of the semiconductor device in claim 1, wherein the master bonds of the first central row and the slave bonds of the second central row are identical for transmitting global signals.

5. The interface of the semiconductor device in claim 4, wherein the global signals include a high voltage, a ground voltage, a clock signal, and/or a data parity information, and/or redundant signals.

6. The interface of the semiconductor device in claim 1, wherein a through-silicon vias is included in connection to the master bonds or the slave bonds, so as to have a connection of face-to-face or face-to-back for stacking the master device and the slave devices.

7. The interface of the semiconductor device in claim 1, further includes a flipping multiplexer in the master bonds or the slave device to recover into original data bits as internally defined in the master device or the slave device.

8. The interface of the semiconductor device in claim 1, wherein the first central row and the first data rows form as a first signal group and a plurality of the first signal groups form a total master bond pattern.

9. The interface of the semiconductor device in claim 8, wherein the second central row and the second data rows form as a second signal group and a plurality of the second signal groups form a total slave bond pattern.

10. The interface of the semiconductor device in claim 1, wherein the master device and the slave devices are stacked up with electric connection between the master bond pattern and the slave bond patterns.

11. The interface of the semiconductor device in claim 1, wherein the master device transmits signals to all the slave interfaces through the master bond pattern and the slave bond patterns, and the slave device responds signals to the master interface through the master bond pattern and the slave bond patterns.

12. The interface of the semiconductor device in claim 1, wherein the first central row is configured to transmit a first portion of global signals, wherein the first array further includes two first peripheral rows being symmetric to the first central row, include transmitting system voltages and a second portion of the global signals.

13. The interface of the semiconductor device in claim 12, wherein in each of the slave devices, the second central row is configured to transmit the first portion of the global signals, wherein the second array further includes two second peripheral rows being symmetric to the second central row, include transmitting the system voltages and the second portion of the global signals.

14. A method for arranging an interface for a semiconductor device, the semiconductor device including a master device and a plurality of slave devices, the method comprising:
providing a master interface, implemented in the master device and including a master bond pattern of master bonds arranged as a first array; and
providing a slave interface, implemented in each of the slave devices and including a slave bond pattern of slave bonds arranged as a second array;
wherein the first array of the master bonds as arranged includes a first central row and first data rows in two parts being symmetric to the first central row,
wherein the second array of the slave bonds as arranged includes a second central row and second data rows in two parts being symmetric to the second central row,
wherein the first central row and the second central row are aligned in connection, and the first data rows are connected to the second data rows.

15. The method for arranging the interface of the semiconductor device in claim 14, wherein the first array further includes two peripheral rows being symmetric to the first central row, wherein the second array further includes two peripheral rows being symmetric to the second central row.

16. The method for arranging the interface of the semiconductor device in claim 14,
wherein the slave interface as arranged further includes a first flip multiplexer at an input side to locate the two parts of the first data rows, and
wherein the slave interface as arranged further includes a second flip multiplexer at an output side to locate the two parts of the second data rows.

17. The method for arranging the interface of the semiconductor device in claim 14, wherein the master bonds of the first central row and the slave bonds of the second central row are identical for transmitting global signals.

18. The method for arranging the interface of the semiconductor device in claim 17, wherein the global signals include a high voltage, a ground voltage, a clock signal, and/or a data parity information, and/or redundant signals.

19. The method for arranging the interface of the semiconductor device in claim 14, wherein a through-silicon vias is included in connection to the master bonds or the slave bonds, so as to have a connection of face-to-face or face-to-back for stacking the master device and the slave devices.

20. The method for arranging the interface of the semiconductor device in claim 14, further including a flipping multiplexer in the master bonds or the slave device to recover into original data bits as internally defined in in the master device or the slave device.

21. The method for arranging the interface of the semiconductor device in claim 14, wherein the first central row and the first data rows form as a first signal group and a plurality of the first signal groups form a total master bond pattern.

22. The method for arranging the interface of the semiconductor device in claim 21, wherein the second central row and the second data rows form as a second signal group and a plurality of the second signal groups form a total slave bond pattern.

23. The method for arranging the interface of the semiconductor device in claim 14, wherein the master device and the slave devices are stacked up with electric connection between the master bond pattern and the slave bond patterns.

24. The method for arranging the interface of the semiconductor device in claim 14, wherein the master device transmits signals to all the slave interfaces through the master bond pattern and the slave bond patterns, and the slave device responds signals to the master interface through the master bond pattern and the slave bond patterns.

25. The method for arranging the interface of the semiconductor device in claim 14, wherein the first central row is configured to transmit a first portion of global signals, wherein the first array further includes two first peripheral rows being symmetric to the first central row, include transmitting system voltages and a second portion of the global signals.

26. The method for arranging the interface of the semiconductor device in claim 25, wherein in each of the slave devices, the second central row is configured to transmit the first portion of the global signals, wherein the second array further includes two second peripheral rows being symmetric to the second central row, include transmitting the system voltages and the second portion of the global signals.

\* \* \* \* \*